April 19, 1932.   G. GRINDROD   1,854,189
METHOD OF STABILIZING FOOD PRODUCTS
Filed May 13, 1929   3 Sheets-Sheet 2

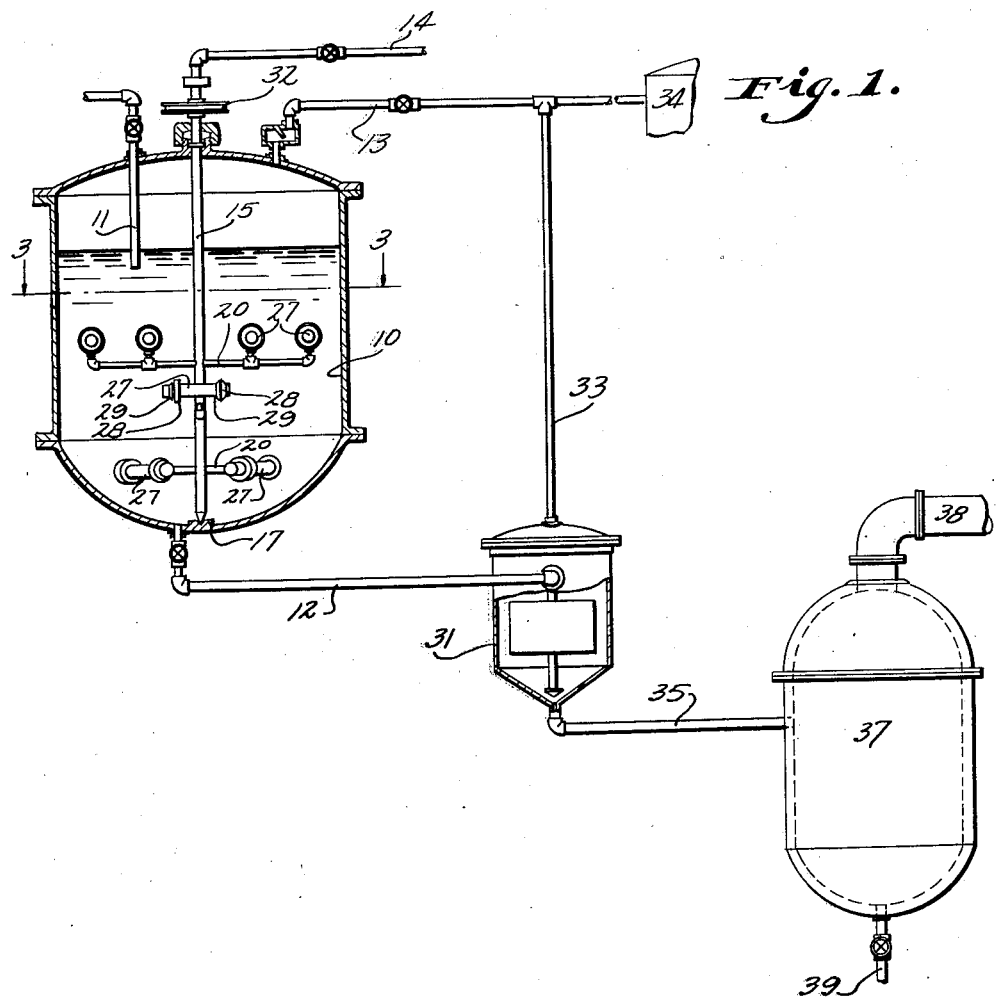

INVENTOR.
George Grindrod
BY
Wheeler, Wheeler & Wheeler
ATTORNEYS.

April 19, 1932.  G. GRINDROD  1,854,189
METHOD OF STABILIZING FOOD PRODUCTS
Filed May 13, 1929  3 Sheets-Sheet 3
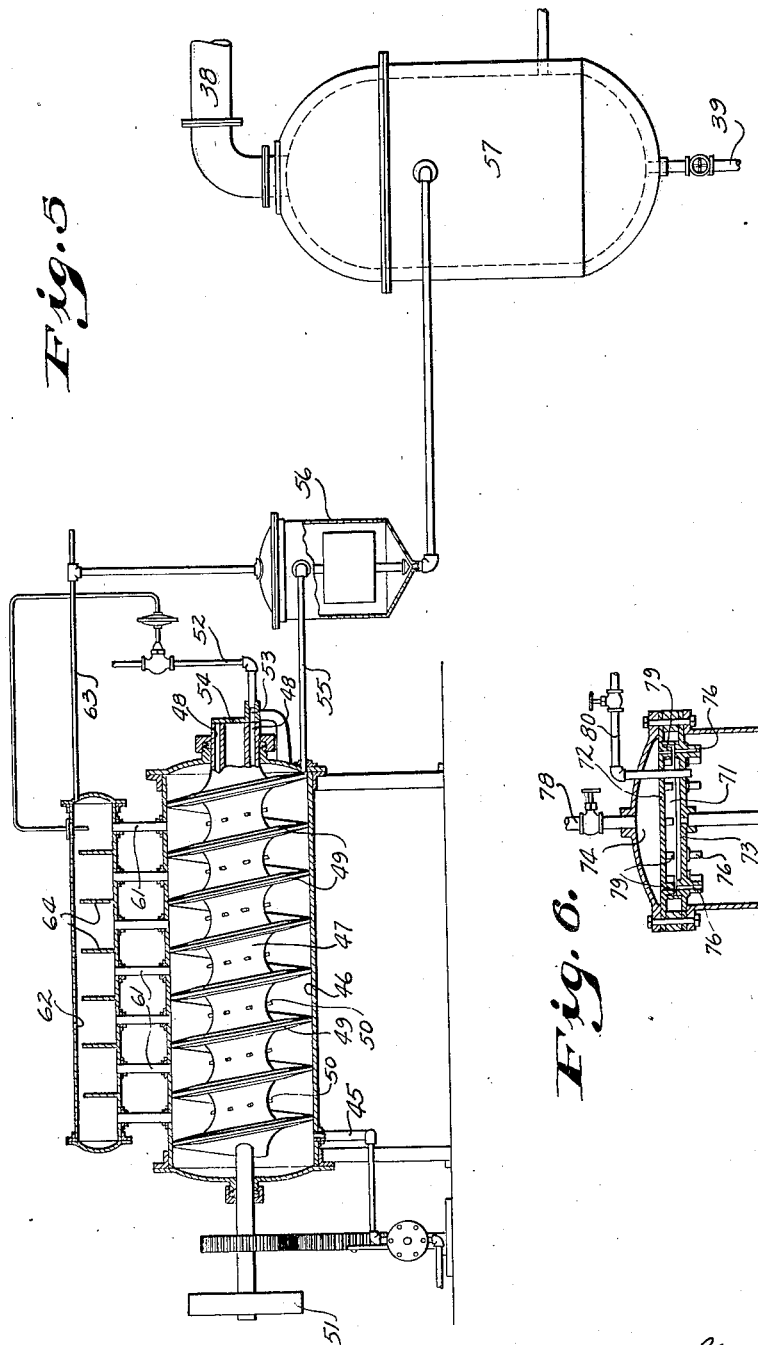
INVENTOR.
George Grindrod
BY
Wheeler, Wheeler & Wheeler
ATTORNEYS.

Patented Apr. 19, 1932

1,854,189

UNITED STATES PATENT OFFICE

GEORGE GRINDROD, OF OCONOMOWOC, WISCONSIN, ASSIGNOR TO GRINDROD PROCESS CORPORATION, OF WAUKESHA, WISCONSIN, A CORPORATION OF WISCONSIN

METHOD OF STABILIZING FOOD PRODUCTS

Application filed May 13, 1929. Serial No. 362,665.

My invention relates to improvements in methods of stabilizing food products, with particular reference to the preliminary stabilization of milk against coagulation preparatory to concentration, sterilization, or other treatment of the milk similar to that incident to the manufacture of the products known as condensed milk, evaporated milk, and sweetened condensed milk.
In a companion application, filed August 28th, 1924, Serial #734,566, Patent No. 1,714,597, I have disclosed a process for sterilizing food products by the sudden change of temperature and the impactive effects obtained by flowing steam at a high velocity through the material. I have discovered that by injecting steam into milk and other food products in sufficient quantity to effect an extremely rapid temperature change in the material as it approaches the boiling point, and particularly if this temperature change is accomplished by violent agitation and the impactive effects of flowing steam, it is possible to disperse the albumen, globulin, other heat coagulable proteins, and calcium salts such as calcium citrate, and that this dispersion results in a great increase in thermal stability. I find that this stabilization is particularly effective in increasing the resistance of the material to coagulation by heat, and that it may take place independently of sterilization and may have no relation in principle to a sterilization process. Apparently maximum stabilization may take place without sterilization, and under some conditions, sterilization may take place either without increase in stability or without destruction of stability. The results in such cases depend upon the method employed to effect the sterilization, and the character of the material treated.

It is my object to devise a process peculiarly adapted for the manufacture of evaporated milk and sweetened condensed milk, whereby the material may be stabilized without sterilization, concentrated without coagulation, hermetically sealed in cans, and which may, if desired, be then sterilized by any process of thermal sterilization without causing a coagulation of the contents of the cans.

Milk received in condenseries varies widely in degree of coagulability. In winter and spring months, the milk is much more coagulable and frequently begins to coagulate in less than ten minutes heating at 240° F. If the thickening takes place before the thermal death point of the spores is reached, then the milk cannot be completely sterilized without destroying the value of the product. For this reason, a condensery sometimes finds it impossible to sterilize its milk supply at all, and heavy loss results. This occurs usually in the winter and spring months because of the higher percentage of albumen contained in average milk at that time of the year, the milk also containing a composition of inorganic salts which is abnormal in quantity or different from the normal composition, and which has a tendency to increase the coagulability of the milk. It is an object of my invention to eliminate the losses that have heretofore resulted from these causes, and to provide a process whereby it is possible at all seasons of the year to produce condensed milk with substantially uniform results.

More particularly stated, it is my object to provide a means for controlling the average coagulability of milk and to obtain, if desired, approximately a fourfold increase in resistance to coagulation, whereby a condensery may receive all of the milk tendered, without regard to its albumen content or the condition of its inorganic solids, and stabilize it to such an extent that it may be sterilized in the can with the exact amount of heat required to produce the best quality of product in a completely sterile condition.

In the practice of my process, I may employ apparatus such as is disclosed in my aforesaid former application #734,566, although I prefer to employ one of the three types of apparatus respectively described in my companion applications, Serial #324,768, filed December 8th, 1928; Serial #348,832, filed March 21st, 1929; and Serial #348,831, filed March 21st, 1929.

In the drawings:

Figure 1 is a vertical sectional view of the heat treating apparatus disclosed in my former application, Serial #348,831, filed March 21st, 1929.

Figure 5 is a conventional illustration, partly in vertical section, of the type of apparatus disclosed in my former application, Serial #348,832, filed March 21st, 1929.

Figure 6 is an elevation, partly in section, of the steam treating chamber disclosed in my former application, Serial #324,768, filed December 8th, 1928.

Like parts are identified by the same reference characters throughout the several views.

Figure 3:
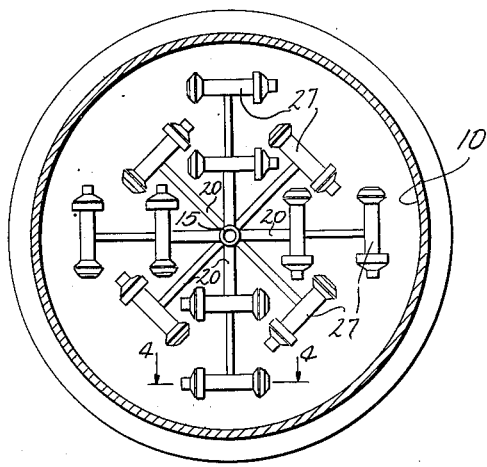
Figure 3 is a sectional view drawn to line 3—3 of Figure 1.

In the manufacture of condensed milk, my process is carried out as follows:

The supply of milk received at the condensery is passed through any suitable type of heater such as a continuous pasteurizer or an internal tubular heater which will suffice to raise its temperature to approximately 150° F. or any temperature below the coagulation point of albumen.

I then test the milk for acidity. The acidity test might be made before raising the temperature as above described, but it can be more easily and accurately made after the milk has been preliminarily heated. If the acidity exceeds approximately .01%, I add a neutralizer such as sodium carbonate in sufficient quantity to reduce the percentage of lactic acid to a point not materially exceeding .01%. I maintain the hydrogen ion concentration of the milk at approximately 6.85% which is the normal hydrogen ion concentration of fresh milk.

After adjustment of the acidity, I then place the pre-warmed milk in a container, preferably a container like that shown in Figure 1 of the drawings, and inject steam into it at high velocity to advance the temperature of the milk rapidly to approximately 225° F. I employ a sufficient number of steam nozzles so that by injecting steam through them at approximately 1400 feet per second, the temperature of the milk will be raised from 150° F. to approximately 225° F. in about three minutes. The number of nozzles required to do this will, of course, depend upon the size of the container and the quantity of milk to be treated.

Upon reaching 225° F., the dispersion of the albumen and calcium salts will be completed. The injection of the steam is then stopped and the excess pressure above the milk discharged into a vacuum chamber, the milk being subsequently delivered into that chamber, and condensed to the desired degree, preferably to about 26% total solids or beyond that degree if the milk is to be shipped in bulk.

After concentration, the product may be placed in cans, hermetically sealed and subjected to a temperature of 240° F. for fifteen or twenty minutes without danger of coagulation. This subsequent treatment not being part of the invention herein disclosed, detailed description thereof is not essential.

While the steam is being injected, it should be permittted to escape from the container with at least sufficient freedom to prevent development of material velocity checking counter pressure.

I find that the thermal coagulation of natural milk is associated principally with the coagulation of the albuminous proteins which it contains. These proteins coagulate to a limited extent when the milk is simply heated to the boiling point, although coagulation is not completed. The albuminous materials form microscopic clots held in suspension with the milk, and when the milk is thereafter subjected to further heating in the can, these clots serve as nuclei on or about which the remainder of the albuminous proteins coagulate or gather, and on which the casein also tends to coagulate and gather.

The coagulability of casein is greatly influenced by the presence of nuclei, and I find that microscopic albumen clots initiate the coagulation of casein, and that without these clots, the casein may be extremely resistant to heat coagulation. If milk is not heated prior to condensation, and if the condensed product is then placed in a can and heated for sterilizing purposes, the coagulation of the albumen will invariably cause complete coagulation of the casein. Heretofore this has been partially overcome by a preliminary heating of the milk but without eliminating the effect of the albumen for the reason that prior to my invention, the albuminous proteins became partially coagulated and even those portions which were not coagulated developed clots or nuclei which promoted casein coagulation.

The actual chemical change involved in the coagulation of albumen, requires an appreciable although a very short period of time. If the albumen is brought suddenly to the temperature required for coagulation, a measurable amount of time will be required, although the time is probably not far from one second at a temperature of 180° F. and is somewhat shorter at higher temperatures. When a mass of milk is heated in the ordinary manner through the range of 180° F. to 210° F. during an interval of about two minutes, the albumen starts to coagulate appreciably at or below 180° F. and has sufficient time to continue the coagulation and form clots, the size of the clots being proportionate to the rate of temperature increase.

By my improved process, I force the chemical change of coagulation of the albumen to take place virtually instantaneously and immediately disperse it as a colloid, thereby preventing the formation of clots and eliminating the coagulation. If the acidity of the milk is within approximately .01% free acid, this process will increase the thermal stability of the milk to approximately fourfold the thermal stability of milk as heretofore treated in the manufacture of condensed milk and evaporated milk. By this statement, I mean that it will withstand a sterilizing temperature in the can of approximately 240° F. for at least forty minutes, or approximately four times the length of time at which condensed milk will coagulate when made by the methods heretofore practiced.

Slight changes in acidity do not influence sterilization at all, but may easily determine the success or failure of stabilization. The reason is that if the casein begins to coagulate during the steam injection treatment, it may be redispersed to a considerable extent along with the albumen and produce no visible change in the condition of the milk, but it is likely to coagulate too rapidly to permit a complete dispersion in the colloidal state. In that event microscopic clots may be formed which thereafter serve as nuclei for the further coagulation of casein. This is avoided by holding the acidity of the milk within the narrow range of approximately .01% of free acid.

My process is effective so long as the amount of coagulable material does not exceed that which the steam jets are capable of completely redispersing. Undoubtedly certain amounts of casein are coagulated and redispersed in all cases, but the percentage of the casein that can be so redispersed is apparently small.

My improved process also causes a redispersion of the calcium salts. Milk produced in the winter or during the spring season, if warmed and condensed in the ordinary manner invariably shows deposits of lime salts as calcium citrate granules which may be found in the bottoms of containers after the milk has been sealed; whereas, milk treated by my process shows no such precipitation of calcium salts. They are probably forced through the chemical change of precipitation and instantly redispersed in such a manner that they exist thereafter in colloidal solution, my product being characterized by complete absence of precipitated granules as well as by its increased thermal stability of approximately four times that of other parts of the same milk treated by the methods heretofore practiced. Thermal stability of my product may be expressed as forty minutes at 240° F. at a density of 26% total solids.

This increased stability makes possible a sterilization in the can for a period which ensures the destruction of even the most highly resistant spores, which, when present, could not be destroyed in condensed and evaporated milk, without coagulating and destroying the value of the product. It also makes possible the production of condensed and evaporated milk at all seasons of the year without requiring selection of milk low in albuminous content and without loss of a portion of the supply.

In the manufacture of sweetened condensed milk, I am able to avoid the progressive thickening or hardening which occurs in that product when produced by the ordinary methods and stored in a warm place. Attempts have heretofore been made to control this progressive hardening of sweetened condensed milk by manipulation of the forewarming temperature, using the lowest temperature practicable. But the results of the process as heretofore practiced are uncertain, and variations in the albumen content of the raw milk are the cause of much defective product and uncertainty as to the stability of the finished product, heavy losses being frequent. By my improved process this tendency toward hardening may be eliminated entirely, particularly if the steam injection is carried on until the temperature has been raised to a point preferably somewhat above 210° F., the precise temperature required being dependent largely upon the percentage of albumen present in the milk, and which, as above stated, varies with the seasons.

By testing the milk for albuminous content and subjecting its particles uniformly to direct contact with high velocity steam jets, to instantly raise their temperature to a range between 210° F. for milk having the lowest albuminous content, to about 225° F. for milk having the highest albuminous content, a substantially uniform non-hardening product may be obtained at all seasons.

It will be observed that whereas the process heretofore practiced required that the temperatures be kept as low as posible to minimize progressive hardening by avoiding coagulation of the albuminous constituents, my improved process reverses this treatment and avoids progressive hardening by rapidly instituting coagulation and instantly redispersing the albuminous constituents and converting them into a permanent colloidal solution, this treatment requiring a much higher temperature than it is possible to employ in the practice of the prior art methods, those methods requiring a temperature ranging from 170° F. to about 185° F. Also, whereas the former process allowed the substances which cause hardening to remain in the milk and ultimately coagulate, my improved dispersion process completely eliminates the hardening tendency since the albuminous materials are chemically changed while being redispersed, thus producing a product which is permanently stable.

The efficiency of my improved process depends quite largely on how completely the milk is brought into intimate contact with the rapidly moving steam jets. I have found by experiment that a high degree of efficiency is attained with jets of approximately five-hundredths of an inch in diameter, and the number of which jets is approximately one for each one to two pounds of milk to be treated.

Figure 4:
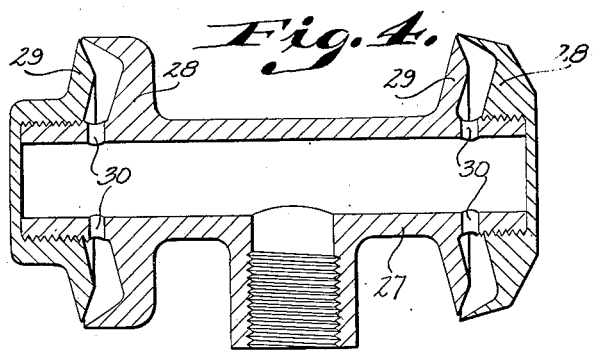
Figure 4 is a sectional view drawn to line 4—4 of Figure 3.
Figure 2:
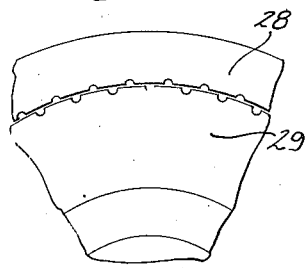
Figure 2 is an enlarged fragmentary sectional view of a portion of one of the nozzles.

When using the apparatus shown in Figures 1 to 4, the milk or other material in liquid-form condition (preferably prewarmed to about 150° F.) may be delivered to a container 10 through a pipe 11, the container having a valved vent pipe 13.

Steam is then delivered to the container 10 through a valved supply pipe 14, vertical tubular shaft section 15 rotatably connected with the pipe 14 and having a point bearing at 16 in a socket block 17.

The shaft section 15 has radial branches 20 preferably arranged in groups with those of each group in a common horizontal plane but radially divergent, and the groups are at different levels. These branch pipes 20 carry distributing chambers or barrels 27 upon which nozzles are mounted having paired flanges 28 and 29 forming nozzle chambers in communication with the barrel through the ports 30. Minute apertures are formed between the margins of the flanges through which jets of steam approximately .05 inch in diameter may be delivered. By slightly rotating one flange upon the other these jets may be divided to form semicylindrical jets and the pitch of the flanges and the drilled apertures is such that the jets are delivered along the surface of a cone. The conical series of jets from one nozzle overlap those of the other nozzle connected with the same barrel, and by directing these nozzles uniformly in the same direction from the branch pipe, the lateral pressure of the steam may be utilized to rotate the structure, although, if desired, it may be rotated by applying power to a pulley 32. If not rotated, the jets develop a movement of rotation in the liquid, the container being cylindrical. After treatment, the material may be drawn off through a valve pipe connection 12.

The combined capacity of the nozzle outlets should be less than that of the supply main 15 and its branches so that sufficient excess pressure can be maintained at the nozzle outlets to insure steam delivery at a high velocity.

Material delivered through the valved pipe 12 is received in a cooling chamber 31, connected at the top by pipe 33 with a condenser conventionally indicated at 34. The bottom of chamber 31 has a valved pipe connection 35 with a concentrating chamber conventionally illustrated at 37. This has a vapor outlet 38 and a valved delivery spout 39 whereby the material may be delivered into suitable receptacles.

In using the apparatus disclosed in Figure 5, the material may be delivered through a pipe 45 into a cylinder 46 having its axis horizontally disposed. Within the cylinder a drum 47 has internal longitudinal passages 48 and an external helical flange 49. The outer margin of this flange is in approximate contact with the wall of the cylinder and when the cylinder is approximately half full, the material between successive turns of the flange 49 will be subdivided and progressively moved in successive batches through the cylinder as the drum rotates. The passages have nozzle outlets 50. The drum is actuated by power applied to pulley 51 and steam is delivered to the passages successively through a pipe 52 and a port 53 in the cap plate 54. The passages 48 successively register with the port 53, steam being thus delivered to the successive batches in sweeping jets as the drum rotates.

The material may be continuously delivered through the outlet 55 to an evaporating chamber 56 associated with a concentrating reservoir 57. Steam escaping from the surface of the material within the cylinder escapes through tubular passages 61 to a steam chamber 62 having an outlet 63 which preferably leads to a vacuum chamber. Chamber 62 has baffles 64 to catch and return liquid material carried upwardly with the steam.

In Figure 6 I have illustrated a series of superposed chambers. Material may be delivered through pipe 70 into an intermediate chamber 71 having top and bottom walls 72 and 73. Steam is delivered from a superposed steam chamber 74 through a series of nozzles 79, the chamber 74 receiving steam through the pipe 78. The nozzles 79 lead through the wall 72 and are aligned with nozzles 76 in the lower wall 73 of the intermediate chamber 71, whereby the material may be blown by the steam through the nozzles 76 into the chamber 75. Steam escapes from chamber 75 through pipe 80 and the material is drawn off through the pipe 81.

In each of the above described constructions, the arrangement is such as to insure presentation of all particles of the material in the path of the steam within the least possible time consistent with practical commercial practice. The success of the process very largely depends upon the uniformity with which all portions of the material are subjected to the steam treatment in such a manner as to redisperse the materials which would otherwise promote coagulation and eliminate that tendency as far as possible.

So far as I am aware, the initiation of coagulation followed by an immediate redispersion of the coagulating ingredients under conditions of violent impact and a rise in temperature of such rapidity as to instantly carry the material through the temperature range which otherwise would most actively promote coagulation, is a mode of treatment entirely new in the art and one of great importance in the arts relating to the manufacture of evaporated milk, condensed milk and similar products.

It appears to be very desirable, if not absolutely essential, that the steam should heat the material instantly by direct contact as distinguished from processes in which part of the milk is heated by direct contact with a hot body and the rest becomes heated by convection or distribution due to its being mixed with the previously heated material.

Stabilizing results may be obtained at temperatures under 210° F. and therefore it is not essential that steam should be allowed to escape from the containers during the treatment above described, but the stabilizing effect obtained at temperatures under 210° F. is not sufficient to protect completely against the progressive hardening of sweetened condensed milk, and it does not fully attain the desired result in stabilizing milk for the production of evaporated milk. Accordingly, the apparatus employed for carrying out the process herein disclosed should include a closed steam treating container provided with a valved vent whereby the escape of steam and the temperature within the container may be regulated.

The use of copper, zinc or iron in surfaces exposed to the material should be avoided. Copper has a coagulating effect on milk and tends to offset stabilization by the means above described. Zinc and iron also affect milk injuriously and I therefore prefer to employ containers having their inner surfaces composed of nickel, tin or alloys of these metals, or equivalent highly resistant materials. The use of such materials will avoid the development of tallowy flavor in sweetened condensed milk, such flavor being entirely due to the catalytic action of metals such as copper and iron which decompose butter fat.

I claim:

1. The process of concentrating liquiform protein containing materials, consisting in first stabilizing the material against coagulation by subjecting the particles uniformly to the impactive effect of particles of steam moving at high velocity until the material approaches a sterilizing temperature, then concentrating the material, placing it in closed containers and subjecting it to a sterilizing temperature.

2. The process of stabilizing liquiform coagulable material against heat coagulation, consisting in initiating heat coagulation in the particles, and immediately subjecting them to the action of high velocity steam jets to redisperse the coagulating material.

3. The process of stabilizing liquiform materials coagulable by heat, consisting in first neutralizing excess acidity and reducing its acidity to approximately .01%, subjecting the particles uniformly to the direct contact of steam in volume sufficient to instantly raise their temperature to a range of 210° F. to 225° F., and then concentrating the material by evaporation.

4. The process of stabilizing liquiform materials coagulable by heat, consisting in first neutralizing excess acidity and reducing its acidity to approximately .01%, subjecting the particles uniformly to the direct contact of steam in volume sufficient to instantly raise their temperature to a range of 210° F. to 225° F., and then concentrating the material by evaporation, placing the same in closed containers and subjecting it to a sterilizing temperature.

5. The process of rendering milk stable against heat coagulation, consisting in subjecting the particles successively and generally to steam jets at a temperature between 210° F. and 225° F. and of a velocity sufficient to disperse the albuminous constituents in a form stable against thermal coagulation, while it has a hydrogen ion concentration insufficient to coagulate casein at the temperature employed.

6. The process of making concentrated milk free from precipitated salts, which consists in subjecting the milk particles successively and generally to the action of steam jets at a temperature between 210° F. and 225° F. and of a velocity sufficient to disperse the albuminous constituents in a form stable against thermal coagulation, then subjecting the milk to evaporation in a vacuum and concentrating it to the desired degree.

7. The process of manufacturing milk products which consists in partially confining the material and subjecting it to the direct action of steam jets delivered into and through the material at a velocity, temperature, and volume sufficient to raise the temperature of the material to a predetermined point between boiling and sterilizing temperatures and maintain said temperature and the injection of steam at said high velocity until the albuminous constituents of the material are completely dispersed in a form stable against thermal coagulation.

8. A concentrated milk product having its albuminous content dispersed in a form stabilized against heat coagulation and its calcium salts dispersed in non-precipitating form.

9. A concentrated milk stabilized against thermal coagulation and precipitation of calcium salts, and having a resistance to coagulation at sterilizing temperatures through a period approximately four times as long as that which its albuminous content would normally permit.

GEORGE GRINDROD.